(12) United States Patent
Bach

(10) Patent No.: US 9,038,711 B2
(45) Date of Patent: May 26, 2015

(54) DEEP-WELL PUMP SYSTEM

(75) Inventor: Jørgen Bach, Brabrand (DK)

(73) Assignee: Grundfos Management a/s, Bjerringbro (DK)

( * ) Notice: Subject to any disclaimer, the term of this patent is extended or adjusted under 35 U.S.C. 154(b) by 224 days.

(21) Appl. No.: 13/521,484

(22) PCT Filed: Dec. 4, 2010

(86) PCT No.: PCT/EP2010/007371
§ 371 (c)(1),
(2), (4) Date: Jul. 11, 2012

(87) PCT Pub. No.: WO2011/085753
PCT Pub. Date: Jul. 21, 2011

(65) Prior Publication Data
US 2013/0233533 A1 Sep. 12, 2013

(30) Foreign Application Priority Data
Jan. 12, 2010 (EP) .................... 10000208

(51) Int. Cl.
| E21B 43/12 | (2006.01) |
| E21B 43/38 | (2006.01) |
| E03B 3/12 | (2006.01) |
| E03B 3/16 | (2006.01) |
| E21B 37/08 | (2006.01) |
| E21B 43/02 | (2006.01) |
| F04B 47/04 | (2006.01) |

(52) U.S. Cl.
CPC ............... E21B 43/121 (2013.01); E03B 3/12 (2013.01); E03B 3/16 (2013.01); E21B 37/08 (2013.01); E21B 43/02 (2013.01); E21B 43/38 (2013.01); F04B 47/04 (2013.01)

(58) Field of Classification Search
CPC ......... E21B 43/38; E21B 37/08; E21B 43/02; E21B 43/121; E03B 3/12; E03B 3/16; F04B 47/04
USPC ............ 166/265, 53, 68; 210/170.06, 170.07; 405/129.85
See application file for complete search history.

(56) References Cited

U.S. PATENT DOCUMENTS

| 5,080,805 A | 1/1992 | Houser |
| 5,143,606 A | 9/1992 | Bernhardt |
| 5,362,400 A | 11/1994 | Martinell |
| 5,701,953 A | 12/1997 | Stecker et al. |
| 5,896,926 A * | 4/1999 | Hama et al. ............... 166/250.07 |

(Continued)

FOREIGN PATENT DOCUMENTS

| CN | 2581527 Y | 10/2003 |
| DE | 3842740 A1 | 6/1990 |

(Continued)

OTHER PUBLICATIONS

Office Action issued Aug. 13, 2013 in CN Application No. 201080061262.9.

(Continued)

Primary Examiner — Daniel P Stephenson
(74) Attorney, Agent, or Firm — Panitch Schwarze Belisario & Nadel LLP

(57) ABSTRACT

A borehole pump system includes an immersion pump (20) and a riser (15) accommodated in the borehole (10). A water treatment system for cleaning pumped water is disposed in the riser.

13 Claims, 2 Drawing Sheets

(56) References Cited

U.S. PATENT DOCUMENTS

| | | | |
|---|---|---|---|
| 5,914,041 A * | 6/1999 | Chancellor | 210/641 |
| 6,352,111 B1 * | 3/2002 | Bode et al. | 166/265 |
| 6,367,555 B1 * | 4/2002 | Senyard et al. | 166/370 |
| 2003/0079876 A1 * | 5/2003 | Underdown | 166/265 |
| 2003/0189010 A1 | 10/2003 | Wilhelm | |
| 2005/0173107 A1 | 8/2005 | Heilmann et al. | |
| 2005/0199551 A1 | 9/2005 | Gordon | |
| 2007/0187088 A1 * | 8/2007 | Ahn | 166/242.5 |
| 2013/0032329 A1 * | 2/2013 | Knobloch et al. | 166/205 |
| 2013/0233533 A1 * | 9/2013 | Bach | 166/53 |

FOREIGN PATENT DOCUMENTS

| | | |
|---|---|---|
| EP | 0486976 A1 | 5/1992 |
| EP | 1178013 A2 | 2/2002 |
| SU | 794121 A1 | 1/1981 |

OTHER PUBLICATIONS

Int'l Search Report issued Jan. 14, 2011 in Int'l Application No. PCT/EP2010/007371.

Office Action issued Apr. 15, 2014 in CN Application No. 201080061262.9.

* cited by examiner

DEEP-WELL PUMP SYSTEM

CROSS-REFERENCE TO RELATED APPLICATIONS

This application is a Section 371 of International Application No. PCT/EP2010/007371, filed Dec. 4, 2010, which was published in the German language on Jul. 21, 2011, under International Publication No. WO 2011/085753 A1 and the disclosure of which is incorporated herein by reference.

BACKGROUND OF THE INVENTION

The present invention relates generally to a borehole pump system with an immersion pump and a riser to be accommodated in the borehole, wherein a water treatment system for cleaning the pumped water is disposed in the riser.

In borehole pump systems, it is part of the prior art to provide a water treatment system for freeing the pumped water of foreign substances. In cold weather conditions, however, there is the risk of the water in the water treatment system freezing. It is known, therefore, to provide the water treatment system with a heat-insulating housing in order to prevent freezing of the water. This additional expenditure, however, increases the cost of the borehole pump system.

It is further known to precipitate dissolved foreign substances, such as for example iron, from the water to be pumped, since iron compounds in particular cause conspicuous discoloration on the bottom of the water containers. The water is aerated in order to precipitate the iron compounds. Under unfavorable conditions, however, the precipitated foreign substances may block up the borehole, so that the operation of the borehole pump system is adversely affected.

It is therefore an objective of the present invention to provide a borehole pump system, wherein a water treatment can be carried out cost-effectively and wherein the reliability of the operation of the borehole pump system is not adversely affected.

The above objection is solved by the present invention with a borehole pump system with an immersion pump and a riser to be accommodated in the borehole, wherein a water treatment system for cleaning the pumped water is disposed in the riser.

BRIEF SUMMARY OF THE INVENTION

The borehole pump system according to a preferred embodiment of the present invention includes an immersion pump and a riser to be accommodated in the borehole. According to a preferred embodiment of the present invention, a water treatment system for purifying the pumped water is disposed in the riser. Thus, since the water treatment system is also intended to be disposed in the borehole or is accommodated in the borehole, the water treatment system is easily protected against frost in this arrangement. Additional items of equipment, such as for example heat-insulating housings or coverings, are unnecessary with the borehole pump system according to the invention.

In the borehole pump system according to a preferred embodiment of the present invention, the water treatment system is preferably disposed above the immersion pump. Advantageously, foreign substances are conveyed upwards together with the water in the borehole, so that they do not become deposited at the bottom of the borehole. Blocking-up of the borehole due to deposited foreign substances is thus effectively avoided. The borehole pump system according to a preferred embodiment of the present invention can thus be operated reliably and in a failsafe manner.

In the borehole pump system according to a preferred embodiment of the present invention, the water treatment system ideally comprises an aerator. Dissolved iron and/or iron compounds, for example, can thus easily be precipitated out of the water through the aeration of the water by means of the aerator. Since, according to a preferred embodiment of the present invention, the aerator is disposed inside the riser and in particular above the immersion pump, the precipitated foreign substances flow upwards, so that no sediment and therefore no blocking-up of the borehole is caused by the precipitated foreign substances. The borehole pump system can therefore also be operated reliably and in a failsafe manner with aeration of the pumped water.

In the borehole pump system according to a preferred embodiment of the present invention, the water treatment system expediently comprises an aeration section, which forms a part of the riser through which the water is conveyed. The aeration section preferably accounts for more than a third, in particular more than two thirds of the vertical extension of the riser in the borehole. This development of a preferred embodiment of the present invention enables a particularly compact design of the borehole pump system, since the riser simultaneously forms both a conveying section as well as an aeration section of the borehole pump system.

In the borehole pump system according to a preferred embodiment of the present invention, the water treatment system advantageously comprises at least one water filter. According to a preferred embodiment of the present invention, the water filter is disposed in the riser and in particular above, i.e. downstream of, the immersion pump. With the immersion pump according to a preferred embodiment of the present invention, the water filter thus filters foreign substances out of the pumped water in the riser and above the bottom of the borehole. The water filter does not therefore cause any sediment of filtered-out foreign substances at the bottom of the borehole, so that, according to a preferred embodiment of the present invention, blocking-up of the borehole is also prevented in this regard and the operational reliability of the borehole pump system is guaranteed.

In the borehole pump system according to a preferred embodiment of the present invention, the water filter is expediently disposed inside the borehole, in particular close to or directly at the upper end. On the one hand, an aeration section as long as possible and consequently thorough purification of the pumped water is achieved with the arrangement of the water filter close to the upper end of the borehole. On the other hand, the water filter can easily be replaced, for example for cleaning, since the water filter merely has to be lifted along a short section of the overall length of the riser out of the borehole or inserted into the latter for the purpose of removal or insertion.

In the borehole pump system according to a preferred embodiment of the present invention, the water filter is preferably a metal filter. Alternatively, or additionally, the water filter is preferably a mineral filter and/or a cartridge filter.

The water filter is fittingly rinsable, in particular back-rinsable.

In the borehole pump system according to a preferred embodiment of the present invention, a rinsing device is expediently provided for rinsing the water filter with compressed air and/or pressurized water.

In the borehole pump system according to a preferred embodiment of the present invention, the rinsing device and the aerator particularly preferably have a common compressed air source.

In a preferred development of a preferred embodiment of the present invention, the riser is at least partially flexible at least upstream of the water filter. In this development of a preferred embodiment of the present invention, parts of the riser are advantageously mobile with respect to one another, so that blocking-up of the riser due to foreign substances is avoided. In particular, the water filter can be reliably back-rinsed upstream of the water filter in the case of a flexible or partially flexible design of the riser, there being no risk of blocking-up of the riser due to foreign substances held back in the water filter. On the contrary, in this development of a preferred embodiment of the present invention the riser is simultaneously cleaned with water by the through-flow constantly taking place both in the normal operation as well as during the back-rinsing of the water filter.

Fittingly, the borehole pump system includes an outlet which is designed for the discharge of residues held back in the water filter. The outlet is expediently disposed at the upper end of the riser. The borehole pump system advantageously comprises a flow path leading upwards from a region located upstream of the water filter to the outlet. During back-rinsing of the filter, the foreign substances held back in the water filter can then be impelled together with the water through this flow path to the outlet, so that no sediment of precipitated foreign substances is formed at the bottom of the borehole even during the back-rinsing of the water filter. Even during the back-rinsing of the water filter, therefore, there is no risk of blocking-up of the borehole due to foreign substances held back in the water filter.

In a preferred development of the borehole pump system, a pressure gauge or gauges are provided upstream and/or downstream of the water filter. In this way, the water permeability of the water filter can be continuously and automatically monitored. For example, a high pressure prevailing upstream of the water filter and, corresponding thereto, a low pressure prevailing downstream of the water filter indicates blocking-up of the water filter. If pressure gauges are provided upstream and downstream of the water filter, the detected pressures are expediently compared with one another by means of an evaluation unit, which is connected for this purpose to the pressure gauges. Alternatively, or in addition, the evaluation unit compares pressures measured upstream and/or downstream of the water filter with standard pressure values or standard pressure value ranges, blocking-up of the water filter being signaled in the event of a divergence of the detected pressure or the detected pressures from the standard pressure values or standard pressure value ranges.

In the borehole pump system according to a preferred embodiment of the present invention, a control device is for example provided, which is designed to detect the pressure or pressures measured with the pressure gauge or gauges and to control/start the rinsing of the water filter as a function of the detected pressure or pressures. The control unit preferably includes an evaluation unit as described above. In this development, the borehole pump system can, as it were, be designed self-maintaining. If the evaluation of the pressure or pressures measured with the pressure gauges signals through the evaluation unit a reduced water permeability of the water filter, the control unit can start or control the rinsing of the water filter.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
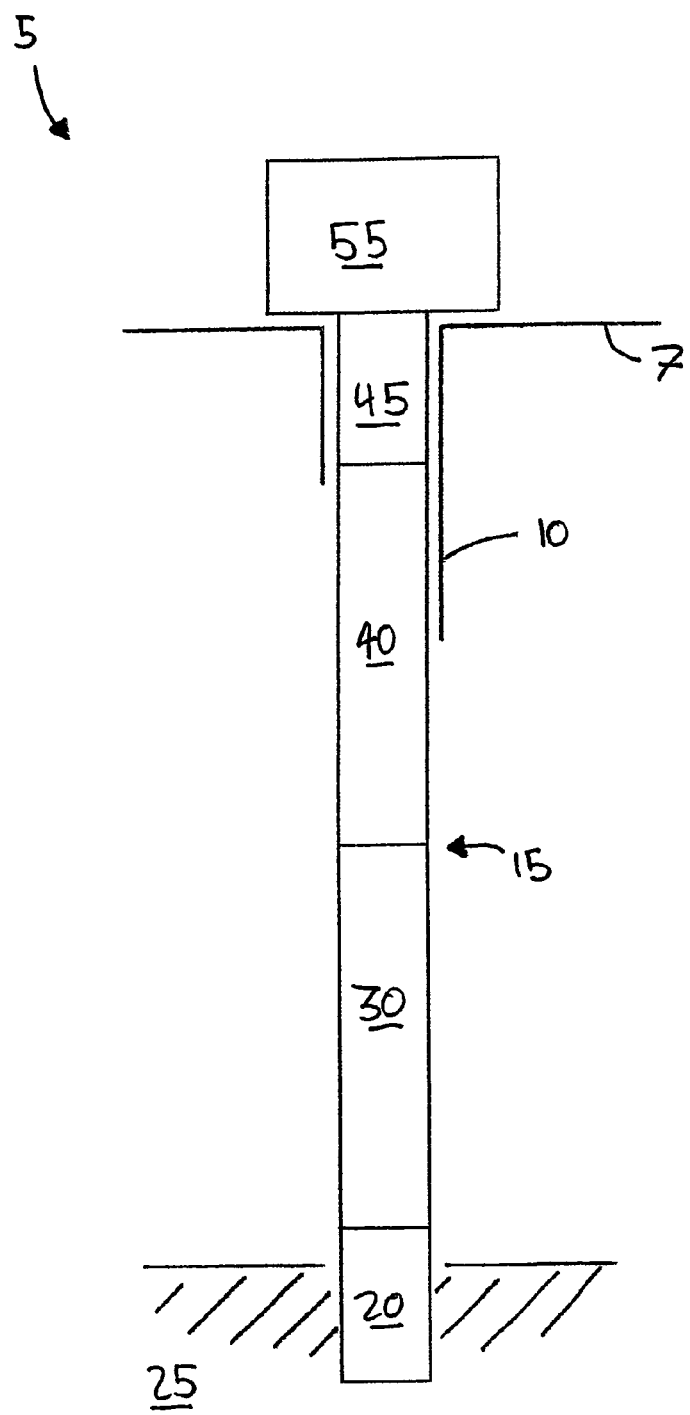
FIG. 1 is a schematic diagram (not to scale) of a borehole pump system in accordance with a preferred embodiment of the present invention.

Certain terminology is used in the following description for convenience only and is not limiting. The words "lower," "bottom" and "upper" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Figure 2:
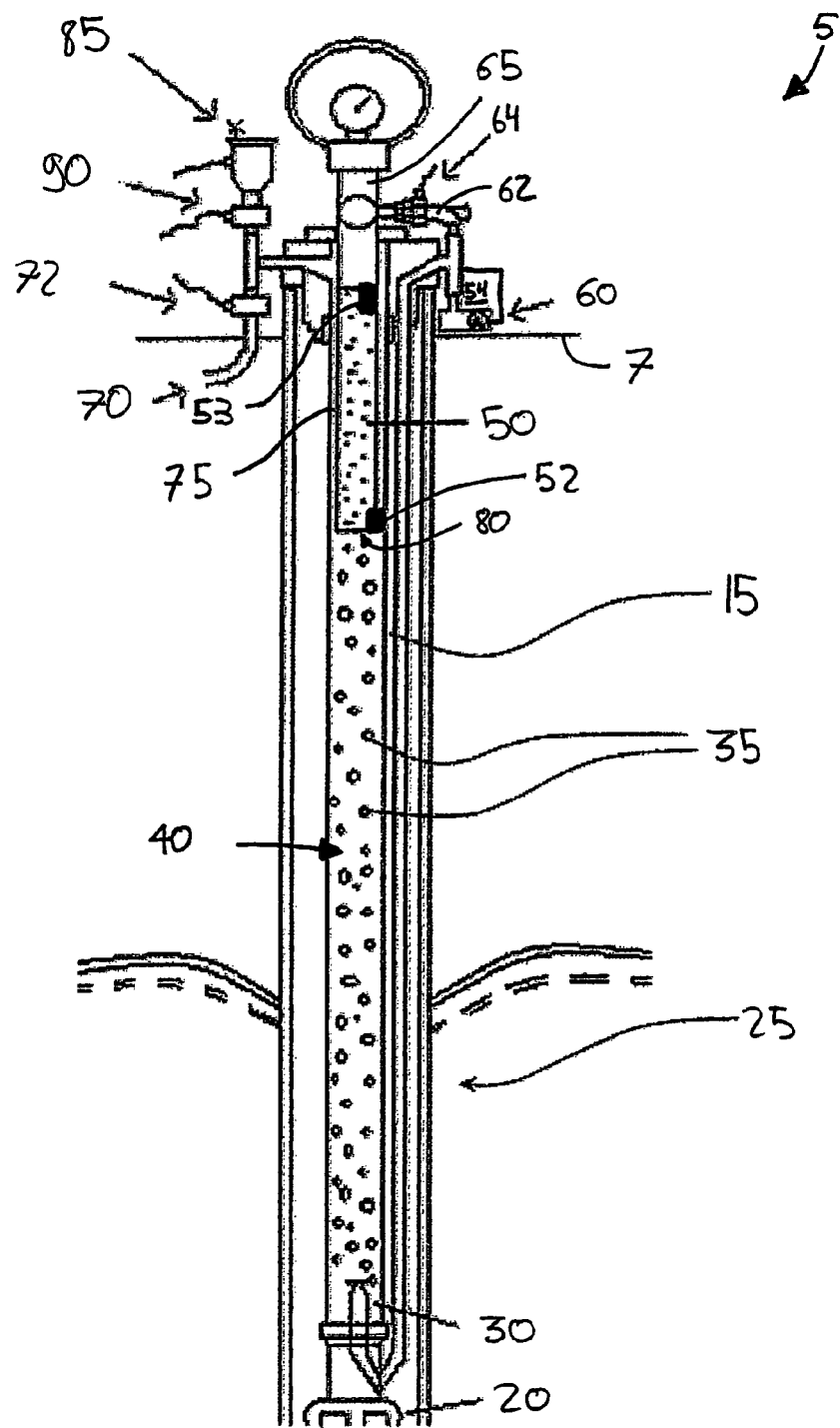
FIG. 2 is a longitudinal cross-sectional view of a simplified representation of the borehole pump system of FIG. 1.

Referring to the drawings in detail, wherein like numerals indicate like elements throughout the several views, FIGS. 1 and 2 show a borehole pump system, generally designated 5, disposed in a borehole 10 extending vertically, i.e., normal to the ground 7, and forming a groundwater pump system.

The borehole pump system 5 preferably includes a riser 15 disposed in borehole 10. Connected to the lower end of the riser 15 is an immersion pump 20, which preferably pumps groundwater out of a groundwater layer 25 through the riser 15 upwards into a wellhead 55. Disposed above the immersion pump 20 is an aerator 30, which preferably feeds air into the riser 15. The fed-in air preferably forms bubbles 35 in the ascending water. The bubbles 35 interact with the pumped water along an aeration section 40. The aeration section 40 accounts for more than two thirds of the vertical extension of the riser 15 (see FIG. 2). As a result of the aeration with the aerator 30, iron and/or iron compounds dissolved in the water first form colloidal particles, which then form ever larger particles and finally particles no longer dissolved in the water and therefore filterable from the water.

A water filter 45 is preferably present above the aeration section 40 at the upper end of the borehole 10 for filtering these particles out of the pumped water. In this example of a preferred embodiment of the present invention, the water filter 45 is constituted as a metal filter in the form of a cartridge filter with a filter cartridge 50 and is designed back-rinsable.

The water filter 45 preferably includes pressure gauges 52, 53, which are disposed upstream and downstream of the filter cartridge 50 of the water filter 45. The pressure gauges 52, 53 are signal-connected to a control device 54, which monitors the pressure values upstream and downstream of the filter cartridge 50 of the water filter 45 and concludes that there is blocking-up of the water filter 45 when these pressure values deviate from a standard pressure value range or when a specific pressure difference or a pressure ratio of these pressure values is exceeded and then starts the back-rinsing of the water filter 45 as described below. The riser 15 is constituted as a flexible hose in the borehole pump system 5, so that no particles can become permanently arrested in the riser 15 during the back-rinsing of the water filter 45. The movements of the hose walls prevent particles and impurities from being arrested.

Above the upper edge of the borehole 10, the borehole pump system 5 terminates with the wellhead 55. The wellhead 55 preferably includes a compressed air source in the form of an air compressor 60, which supplies the aerator 30 with compressed air. Furthermore, the air compressor 60 is connected via a supply line 62 and a valve 64 disposed therein to a region 65 of the water filter 45 located downstream of and above the water filter 45. The supply of this region 65 located downstream of the water filter 45 with compressed air permits back-rinsing of the water filter 45. For the back-rinsing of the water filter 45, the downstream region 65 of the water filter 45 is supplied with compressed air and the foreign substances held back in the water filter 45 are rinsed out toward the side 80 of the water filter 45 facing upstream. The rinsed-out foreign substances are swept together with water into the wellhead 55 along a flow path 75 leading upwards vertically along the outer side of the filter cartridge 50 of the water filter 45, from which they can be discharged via an outlet line 70 of the wellhead 55. The outlet line 70 preferably includes for this purpose a compressed air feed-in 85 with a valve 90 connected to air compressor 60. The compressed air feed-in feeds compressed air from the air compressor 60 into the outlet line 70 when the valve 90 is open. The outlet line 70 further includes a valve 72, which can be opened for the discharge of the foreign substances through the outlet line 70. The residues swept up into the wellhead 55 can be expelled through the outlet line 70 by means of the compressed air fed in by means of compressed the air feed-in 85. The back-rinsing of the water filter 45 is started and controlled by the control device 54 which, to adjust the valves 64, 72, 90, is signal-connected to the latter for this purpose.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A borehole pump system comprising an immersion pump (20) and a riser (15) accommodated in a borehole (10), wherein a water treatment system for cleaning pumped water is disposed in the riser, the water treatment system comprising an aerator (30) disposed entirely in the riser and which precipitates dissolvent through aeration of the pumped water.

2. The borehole pump system according to claim 1, wherein the water treatment system is disposed above the immersion pump (20).

3. The borehole pump system according to claim 1, wherein the water treatment system comprises an aeration section (40), which accounts for more than two thirds of a vertical extension of the riser (15) in the borehole (10).

4. The borehole pump system according to claim 1, wherein the water treatment system comprises at least one water filter (45).

5. The borehole pump system according to claim 4, wherein the water filter (45) is disposed inside the borehole (10) close to or directly at an upper end thereof.

6. The borehole pump system according to claim 4, wherein the water filter (45) is one of a metal, a mineral filter and a cartridge filter.

7. The borehole pump system according to claim 4, wherein the water filter (45) is back-rinsable.

8. The borehole pump system according to claim 7, further comprising a rinsing device for rinsing the water filter (45) with compressed air or pressurized water.

9. The borehole pump system according to claim 8, wherein the rinsing device and the aerator (30) have a common compressed air source (60).

10. The borehole pump system according to claim 4, wherein the riser (15) is at least partially flexible at least upstream of the water filter (45).

11. The borehole pump system according to claim 4, further comprising pressure gauges (52, 53) provided upstream or downstream of the water filter (45).

12. The borehole pump system according to claim 11, further comprising a control device (54) to detect a pressure measured with the pressure gauges (52, 53) and to control or start rinsing of the water filter (45) as a function of the detected pressures.

13. A borehole pump system comprising an immersion pump (20) and a riser (15) accommodated in a borehole (10), wherein a water treatment system comprising at least one water filter (45) for cleaning pumped water is disposed in the riser and the borehole pump system further comprises an outlet (70) which is designed for discharge of residues held back in the water filter (45).

* * * * *